Patented Apr. 10, 1945

2,373,170

UNITED STATES PATENT OFFICE 2,373,170

PURIFICATION OF BUTADIENE

David Craig, Silver Lake, Ohio, assignor to The B. F. Goodrich Company, New York, N. Y., a corporation of New York No Drawing. Application May 2, 1942, Serial No. 441,544

4 Claims. (Cl. 202—41)

This invention relates to the concentration and purification of butadiene-1,3, hereinafter referred to as butadiene, and it pertains more particularly to an improved method of separating butadiene from other four-carbon hydrocarbons of about the same boiling point such as butane and the several butenes or butylenes.

It is well known that butadiene is formed along with other hydrocarbons in the cracking of petroleum. With suitable regulation of the cracking conditions it is possible to convert a considerable proportion of the petroleum into butadiene. The butadiene which is so produced, however, is accompanied by other lower hydrocarbons which frequently preponderate greatly over the butadiene. The usual fractionation of the liquified refinery gases obtained from the cracking process is capable of separating butadiene quite sharply from accompanying hydrocarbons containing fewer carbon atoms such as methane, ethane, ethylene, propane and propylene, as well as from those containing more carbon atoms, such as the pentanes, amylenes, etc., but is incapable of bringing about an effective separation of butadiene from other four-carbon hydrocarbons such as butane and butylenes. In the preparation of pure butadiene from cracked petroleum, therefore, the four-carbon hydrocarbons may be isolated as a group by fractional distillation, but, because of the close similarity in their boiling points, recourse to some other procedure is essential for the isolation of the butadiene itself.

It has already been proposed to separate butadiene from other four-carbon hydrocarbons by distilling the hydrocarbon mixture through a fractionating column down which flows a suitable solvent, the butadiene being taken up by the solvent and the other hydrocarbons being discharged at the top of the column. Previous workers have made a number of different suggestions as to suitable solvents to be used for this kind of process. One suggestion has been that the solvent should be one which forms separate liquid layers when shaken with a liquid mixture of butadiene and butylene. Another suggestion has been that the solvent should have a high dielectric constant. Another suggestion has been that the solvent should be miscible with both water and benzene.

I have discovered that none of the properties suggested by previous workers and enumerated above have any true relationship to selectivity of solvents and their consequent utility in the separation of butadiene from butylenes and butane, but that a class of materials which does not conform at all to these supposed requirements is of great value for this purpose. This class of materials consists of normally liquid unsaturated alcohols, composed of carbon, hydrogen and oxygen, which contain from three to eight carbon atoms and at least one olefinic double bond. Examples of suitable unsaturated alcohols in this class are allyl alcohol or 2-propen-1-ol, 3-buten-1-ol (1-buten-4-ol or allyl carbinol), 2-buten-2-ol (methyl vinyl carbinol), 2-buten-1-ol (crotonyl alcohol or propenyl carbinol), 1-penten-3-ol (ethyl vinyl carbinol), 3-penten-2-ol (dimethyl propenyl carbinol), 4-penten-1-ol (beta-allyl ethyl alcohol), 4-penten-2-ol (allyl methyl carbinol), 2-methyl-4-penten-2-ol (allyl dimethyl carbinol), 3-ethyl-5-hexen-3-ol (allyl diethyl carbinol) and other similar olefinic alcohols as well as furfuryl alcohol, alicyclic unsaturated alcohols such as cyclopentenol and cyclohexenol and the like. Mixtures of such alcohols with each other or even with small amounts of water may also be used. The preferred unsaturated alcohols of this class for use as selective solvents are the olefinic alcohols containing from three to six carbon atoms such as the various butenols and pentenols.

These unsaturated alcohols plainly do not conform to the supposed requirements for selective solvents for butadiene stated by previous workers. They are generally completely miscible under ordinary conditions with liquid butadiene or butylene or mixtures thereof, and therefore incapable of forming two liquid layers. Their dielectric constants are much lower than many other types of compounds and only a part of the compounds in this class are miscible with water. Moreover, it is quite surprising that the unsaturated olefinic alcohols should act as selective solvents for butadiene in view of the fact that many of the corresponding saturated alcohols do not possess this property. Nevertheless, the unsaturated alcohols of the class described are excellent selective solvents for butadiene and can be used to bring about any desired degree of separation from butylene and butane.

In the practice of this invention, crude butadiene, containing butanes and butylenes but no appreciable proportions of other materials is separated into fractions containing any desired proportions of butadiene by extracting the crude butadiene, in the vapor state, with a liquid unsaturated alcohol of the class described and then separating the dissolved butadiene from the alcohol by distillation. A considerable enrichment of butadiene may be effected merely by passing the vapors of the hydrocarbon mixture up a scrubbing tower down which the liquid unsaturated alcohol is allowed to flow or by any other simple method of bringing the impure butadiene vapors into contact with the solvent, but, for more quantitative separations of butadiene from butylenes and butane it is necessary to pass the vapor of the crude butadiene through an efficient fractionating column down which the solvent is allowed to flow. In this latter process it is preferred to maintain the rate of flow of the solvent down the fractionating column, compared to the rate of removal of impurities, above a certain critical ratio, as is pointed out in detail in the copending application of Waldo L. Semon and David Craig, Serial No. 297,342, filed September 30, 1939. This critical ratio for the selective solvents of this invention is much lower than for many of the previously known solvents, being between about 15 to 30, hence the ratio chosen for actual operation will ordinarily be from 20 to 40 or perhaps even higher.

The solvents of this invention may be employed in any of the vapor-liquid extraction processes at normal temperature and pressure, that is, room temperature and 1 atmosphere pressure, or temperatures and pressures either above or below normal may be employed. Best results are obtained by choosing a temperature and pressure such that the vapors of the materials to be separated are about 15 to 50% soluble in the solvent used. This condition is best realized with the solvents of this invention when employing a temperature of room temperature or lower and a pressure of about one atmosphere, hence these conditions are preferred.

A convenient apparatus for the preparation of butadiene of a high degree of purity is a conventional fractionating column containing bubble cap plates, or any equivalent construction. For continuous separation of 95% butadiene from a hydrocarbon mixture containing 50% butadiene and 50% butylenes and butane, a column containing about thirty plates above the feed and about thirty plates below the feed is ordinarily adequate. For an intermittent operation a somewhat shorter column, say of thirty or thirty-five plates, may be used. Such an apparatus will differ from those employed in ordinary fractional distillations only in that a constant flow of the desired solvent will replace the usual reflux of condensate to the head of the column. It will, of course, be provided with a suitable boiler for supplying vapors of enriched butadiene to the foot of the column and with means for ultimately stripping the purified butadiene from the solvent. Any other convenient apparatus may also be employed, it being understood that the invention is not intended to be limited to any particular process or apparatus for the liquid-vapor extraction.

As a specific example of one embodiment of the invention a mixture of hydrocarbons containing 51% butadiene and the remainder butylenes and butane is dissolved in 3-buten-1-ol and the solution is placed in the kettle of an intermittent still having thirty bubble cap plates. Slow distillation of the butadiene is started and 3-buten-1-ol is supplied at the top of the column in quantities thirty-five times the weight of the impurities removed. The initial fractions contain only small proportions of butadiene while the final fraction amounting to about 50% of the batch contains about 95% butadiene. Similar results may be obtained with 2-buten-1-ol 4-pentene-1-ol, furfuryl alcohol or any other of the class of materials set forth above.

It is to be understood that many variations in the methods of operation and in the particular conditions of the extraction may be made without departing from the spirit and scope of the invention as defined in the appended claims.

I claim:

1. A process for separating butadiene from a mixture of four-carbon hydrocarbons having a substantially constant boiling point and including butadiene, butylenes and butanes, which comprises extracting a gaseous mixture of said hydrocarbons with a liquid butenol, and recovering enriched butadiene from the butenol.

2. A process for separating butadiene from a mixture of four-carbon hydrocarbons having a substantially constant boiling point, which comprises distilling the mixture through an efficient fractionating column down which flows a stream of liquid 3-buten-1-ol, and recovering enriched butadiene from the 3-buten-1-ol.

3. A process for separating butadiene from a mixture of four-carbon hydrocarbons having substantially the same boiling points and including butadiene, butylenes and butanes, which comprises distilling the mixture through an efficient fractionating column down which flows a stream of liquid butenol, and recovering enriched butadiene from the butenol.

4. A process for separating butadiene from a mixture of four-carbon hydrocarbons having substantially the same boiling points and including butadiene, butylenes and butanes, which comprises extracting the said mixture of hydrocarbons in the gaseous state with a liquid olefinic alcohol containing an open chain of from four to eight carbon atoms, and recovering enriched butadiene from the alcohol.

DAVID CRAIG.